United States Patent Office 3,062,819
Patented Nov. 6, 1962

3,062,819
1-[(2-AMINO-4-SUBSTITUTED AMINO - 1,3,5 - TRIAZINYL-6-YL)METHYL], 1,1-DIALKYL HYDRAZINIUM SALTS
Seymour L. Shapiro, Hastings-on-Hudson, and Louis Freedman, Bronxville, N.Y., assignors to U.S. Vitamin & Pharmaceutical Corporation, New York, N.Y., a corporation of Delaware
No Drawing. Filed Mar. 10, 1961, Ser. No. 94,706
6 Claims. (Cl. 260—249.9)

This invention is concerned with novel 1-[(2-amino-4-substituted amino - 1,3,5-triazinyl-6-yl)methyl]1,1-dialkyl hydrazinium salts of the structural formula:

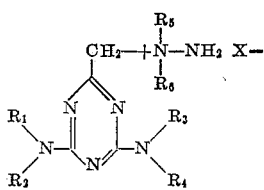

wherein $R_1$ is lower alkyl, aralkyl, aryl, substituted aryl, such substituents including lower alkyl, lower alkoxy and halogen, $R_2$ is hydrogen or lower alkyl and $R_1$ plus $R_2$ with the attached nitrogen are piperidino, pyrrolidino, indolino, tetrahydroquinolino, and tetrahydroisoquinolino; $R_3$ and $R_4$ alike and different are hydrogen and/or lower alkyl. $R_5$ and $R_6$ are lower alkyl groups, and also $R_5$ plus $R_6$ with its attached nitrogen is a morpholino group; X is a non-toxic anion derived from inorganic acids such as halide, sulfate and the like, or an organic acid, such as acetic acid, malic acid or theophylline.

The preferred embodiment of this invention is described by the formula:

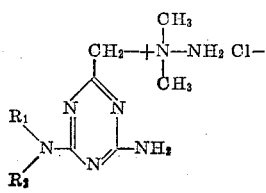

The compounds are conveniently prepared by reaction of the halomethylguanamine with the unsymmetrically disubstituted hydrazine as for example 1,1-dimethylhydrazine. Upon reaction over a suitable period, generally 2 to 4 hours in an inert organic solvent such as acetonitrile at ambient temperature, the formed hydrazinium salt precipitates from solution and can be separated by filtration.

Typical halomethyl compounds which are employed as intermediates in the reaction are described in Table I and their method of preparation has been detailed by Shapiro et al., J. Org. Chem., 26 68 (1961).

TABLE I
Chloromethylguanamines [a]

| $R_1$ | $R_2$ | M.P.[b] |
|---|---|---|
| $CH_3$— | $CH_3$— | 176–179 |
| $C_3H_5$—[c] | H— | 125–126 |
| n-$C_4H_9$— | H— | 118–120 |
| n-$C_5H_{11}$— | H— | 118–119 |
| i-$C_5H_{11}$— | H— | 103–105 |
| —$(CH_2)_5$— | | 160–162 |
| $C_6H_5CH_2CH_2$— | H | 145–147 |
| $C_6H_5CH_2$— | $CH_3$— | 115–117 |
| p-$CH_3C_6H_4$— | H— | 162–163 |
| p-$CH_3OC_6H_4$— | H— | 185–187 |
| m-$ClC_6H_4$— | H— | 129–134 |
| p-$ClC_6H_4$— | H— | 185–187 |
| 3,4-di$CH_3C_6H_3$— | H | 218 |
| —$C_6H_4CH_2CH_2$—[d] | | >300 |
| —$C_6H_4CH_2CH_2$—[e] | | 135–147 |
| —$CH_2C_6H_4CH_2CH_2$—[f] | | 178–180 |
| $CH_3$— | $CH_3$— | 65–67 |
| $C_6H_5$— | H— | 105 |
| 2,6-di$CH_3C_6H_3$— | H— | 140–141 |
| —$C_6H_4CH_2CH_2$—[d] | | 135–136 |

[a] $R_3$ and $R_4$ equal hydrogen, except for last four compounds where $R_3$ and $R_4$ equal methyl. [b] Melting points are uncorrected. [c] $C_3H_5$ equals allyl. [d] With attached nitrogen is derived from indoline. [e] With attached nitrogen is derived from tetrahydroquinoline. [f] With attached nitrogen is derived from tetrahydroisoquinoline.

The products of this invention are conveniently solubilized by employment of one equivalent of 0.1 N hydrochloric acid and upon evaluation of their pharmacological properties, are particularly effective as muscle relaxants and as anticholinergic agents.

While the anion X is ordinarily retained as chloride, by employment of reactant halomethylguanamines wherein the halogen is bromide or iodide, the corresponding products wherein X is bromide or iodide are conveniently accessible.

In addition, these hydrazinium halides can be converted to the corresponding theophyllinate upon metathesis with silver theophyllinate.

As representative of the manner in which the invention may be practiced, the following general example is presented which, however, is not to be considered as limiting.

EXAMPLE 1

PROCEDURE FOR 1-[(2-AMINO-4-SUBSTITUTED AMINO-1,3 5 - TRIAZINYL - 6 - YL)METHYL],1,1 - DIMETHYLHYDRAZINIUM CHLORIDES

A solution of 0.01 mole of the chloromethylguanamine of Table I in 40 ml. of hot acetonitrile was treated with 0.6 g. (0.01 mole) of dimethylhydrazine in 3 ml. of acetonitrile. After 2–3 hours, the white precipitate of formed product was separated and recrystallized to give the products described in Table II.

TABLE II

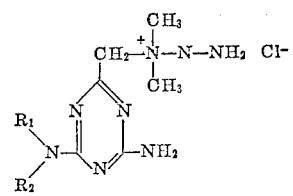

| R₁ | R₂ | M.P. °C[a] | Percent[b] yield | R.S.[c] | Formula | Carbon Calc. | Carbon Found | Hydrogen Calc. | Hydrogen Found | Nitrogen Calc. | Nitrogen Found |
|---|---|---|---|---|---|---|---|---|---|---|---|
| n-C₄H₉— | H | 190–191 | 39 | A | C₁₀H₂₂ClN₇ | 43.6 | 44.0 | 8.0 | 7.9 | 35.6 | 35.7 |
| n-C₅H₁₁— | H | 182–184 | 33 | A | C₁₁H₂₄ClN₇ | 45.6 | 45.7 | 8.4 | 8.3 | 33.8 | 34.4 |
| i-C₅H₁₁— | H | 173–176 | 37 | A | C₁₁H₂₄ClN₇ | | | | | 33.8 | 34.4 |
| —(CH₂)₅— | | 211–212 | 58 | A | C₁₁H₂₂ClN₇ | | | | | 34.1 | 33.8 |
| C₆H₅CH₂— | H | 120–121 | 42 | B | C₁₄H₂₂ClN₇ | | | | | 30.3 | 30.6 |
| p-CH₃C₆H₄— | CH₃— | 224–225 | 39 | C | C₁₃H₂₀ClN₇ | 50.4 | 50.4 | 6.5 | 6.6 | | |
| o-CH₃C₆H₄— | C₂H₅— | 213–214 | 37 | A | C₁₅H₂₄ClN₇ | 53.3 | 52.8 | 7.2 | 7.0 | 29.0 | 29.3 |
| p-ClC₆H₄— | H | 242–243 | 17 | D | C₁₂H₁₇Cl₂N₇ | 43.6 | 44.0 | 5.2 | 5.5 | | |
| p-CH₃OC₆H₄— | H | 229–230 | 33 | A | C₁₃H₂₀ClN₇O | 47.9 | 48.4 | 6.2 | 6.3 | | |

[a] Melting points are not corrected and were established on a Fisher-Johns melting point block.   [b] Yields are reported as recrystallized product, which was obtained in 30–70% of the crude products.   [c] R.S. is recrystallizing solvent: A equals ethanol-hexane; B equals isopropyl alcohol-hexane; C equals methanol-ether; D equals ethanol.

In a similar manner the unsymmetrically di-substituted hydrazine may be varied as 1,1-diethylhydrazine, 1,1-di-n-propylhydrazine, N-amino-morpholine, and reacted with the appropriate halomethylguanamine to give similar products. Additionally, others of the halomethylguanamines listed in Table I afford the dimethylhydrazinium chloride on treatment with dimethylhydrazine.

It is understood that it is intended to cover all changes and modifications of the examples of the invention herein chosen for the purpose of illustration which do not constitute departures from the spirit and scope of the invention.

We claim:

1. The compound

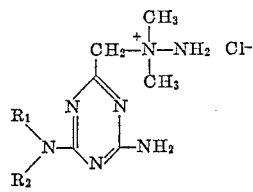

wherein R₁ is selected from the group consisting of lower alkyl, phenyl-lower alkyl, phenyl and mono-substituted phenyl, said substituents on the phenyl being selected from the group consisting of methyl, methoxy and chloro and R₂ is selected from the group consisting of hydrogen and lower alkyl, and wherein R₁ plus R₂ with the attached nitrogen is selected from the group consisting of piperidino, indolino, tetrahydroquinolino, and tetrahydroisoquinolino.

2.

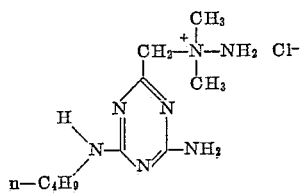

3.

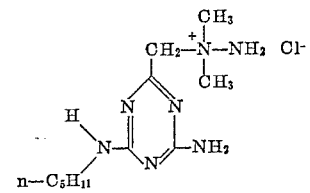

4.

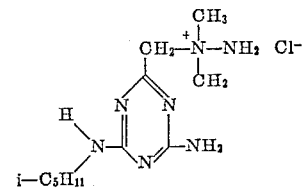

5.

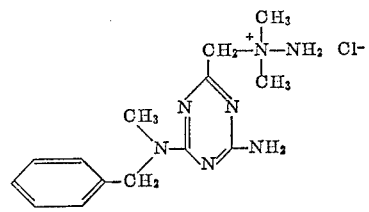

6.

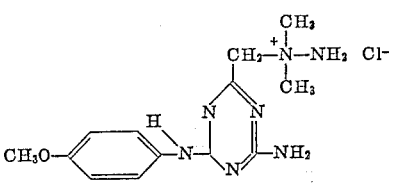

References Cited in the file of this patent

UNITED STATES PATENTS

| 2,719,156 | deBenneville et al. | Sept. 27, 1955 |
| 2,848,452 | Schuller | Aug. 19, 1958 |

UNITED STATES PATENT OFFICE
CERTIFICATE OF CORRECTION

Patent No. 3,062,819            November 6, 1962

Seymour L. Shapiro et al.

It is hereby certified that error appears in the above numbered patent requiring correction and that the said Letters Patent should read as corrected below.

Column 1, lines 18 to 25, the upper portion of the formula should appear as shown below instead of as in the patent:

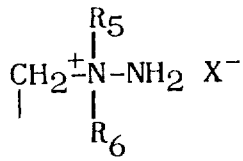

lines 45 to 52, the upper portion of the formula should appear as shown below instead of as in the patent:

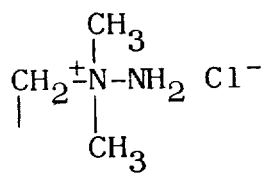

column 2, line 2, for "26" read -- 26 --; line 57, for "1,3 5 -" read -- 1,3,5 - --; column 4, lines 36 to 43, the upper portion of the formula should appear as shown below instead of as in the patent:

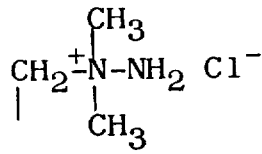

same column 4, lines 57 to 63, for that portion of the formula reading

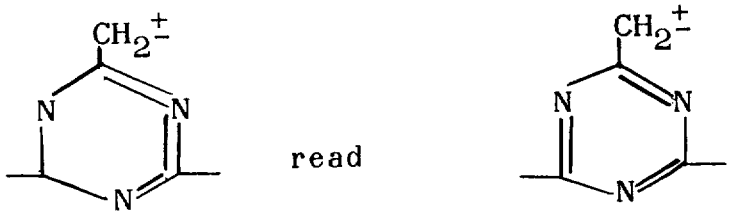

Signed and sealed this 28th day of May 1963.

(SEAL)
Attest:

ERNEST W. SWIDER
Attesting Officer

DAVID L. LADD
Commissioner of Patents